Figure 1:
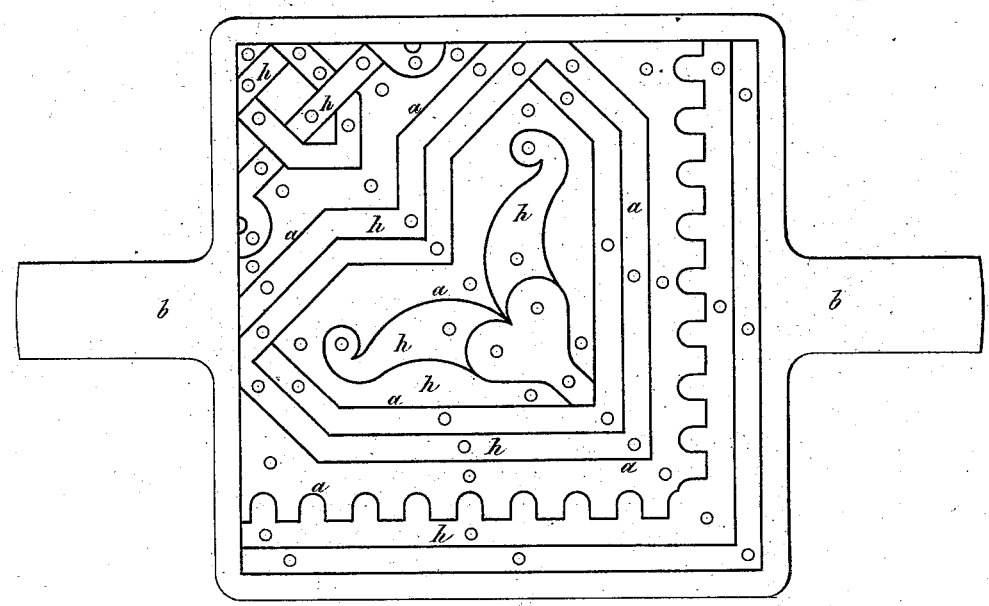

(No Model.)

3 Sheets—Sheet 1.

J. LARMANJAT.
MANUFACTURE OF MOSAIC AND OTHER TILES.

No. 294,475. Patented Mar. 4, 1884.

Witnesses:
C. Sedgwick
Alfred H. Davis

Inventor:
J. Larmanjat
By Munn & Co
Attorneys.

(No Model.)  3 Sheets—Sheet 2.

J. LARMANJAT.
MANUFACTURE OF MOSAIC AND OTHER TILES.

No. 294,475. Patented Mar. 4, 1884.

Witnesses:
C. Sedgwick
Alfred H. Davis

Inventor:
J. Larmanjat
By Munn & Co
Attorneys.

(No Model.) 3 Sheets—Sheet 3.

J. LARMANJAT.
MANUFACTURE OF MOSAIC AND OTHER TILES.

No. 294,475. Patented Mar. 4, 1884.

Witnesses:
C. Sedgwick
Alfred H. Davis

Inventor:
J. Larmanjat
By Munn & Co.
Attorneys.

UNITED STATES PATENT OFFICE.

JEAN LARMANJAT, OF PARIS, FRANCE.

MANUFACTURE OF MOSAIC AND OTHER TILES.

SPECIFICATION forming part of Letters Patent No. 294,475, dated March 4, 1884.

Application filed December 12, 1883. (No model.) Patented in France March 27, 1876, No. 112,794, and September 12, 1878, No. 126,514; in England December 28, 1876, No. 5,021, and in Belgium March 1, 1880, No. 50,691.

*To all whom it may concern:*

Be it known that I, JEAN LARMANJAT, of the city of Paris, France, have invented new and useful Improvements in the Manufacture of Mosaic and other Tiles, of which the following is a full, clear, and exact description.

This invention relates to a process of brightening the colors of so-called "mosaic" or "plain" tiles, and to a mode of molding such tiles. I will describe *seriatim* these improvements in the manufacture of tiles, and which together constitute the invention for which a patent is applied.

The first improvement relates to a mode of brightening the colors of the tiles. Having remarked that the surface of certain products manufactured, generally, of binding materials in a pulverulent condition or hydraulic cements and limes slightly moistened and mixed with suitable mineral coloring-matter became veiled after the lapse of a certain time by a sort of efflorescence, composed, generally, of carbonate of lime or silicate of lime more or less basic, I have sought to obviate this defect, and I have found that by treating the hydraulic cements and limes with a solution of soap (preferably soft soap, on account of the excess of caustic potash which it contains) the veil or cloud formed by the efflorescence of the carbonate or silicate of lime disappears almost completely, leaving the colored portions visible in their natural tints. The process therefore consists in moistening the powdered materials or cements with water containing from one to three per cent. of soft soap, and then molding in any suitable molds, and treating the tiles after they have been molded and while they are yet porous with a solution of soft soap. By this mode of treatment the free alkali—potash, for instance—displaces a portion of the lime of the opaque insoluble salt which formed the veil. After the tiles have been treated in this way, they are cleaned with a brush or sponge to remove the excess of soap. Paraffine, ozocerite, and other substances dissolved in a suitable vehicle—such as spirit of turpentine or other similar hydrocarbon—produce the same brightening effect as soft soaps, by reason of the fatty matter they contain, which, like the fatty matter of soaps containing an excess of alkali, opposes the efflorescence of the salts of lime.

My second improvement relates to a mode of molding inlaid designs in the manufacture of ornamental tiles, which I will describe with reference to the annexed drawings, wherein I have represented two examples of molds employed in this process of manufacture.

Figure 2:
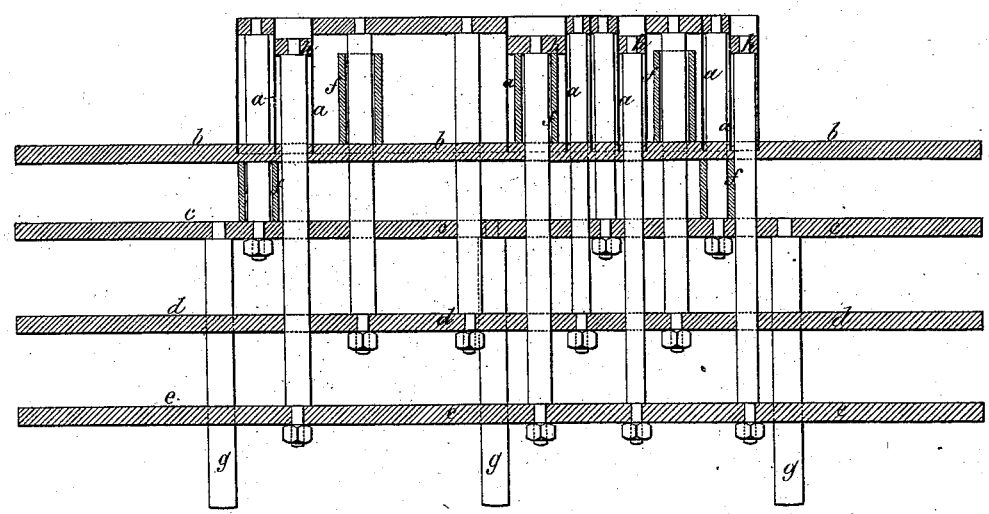
Figure 3:
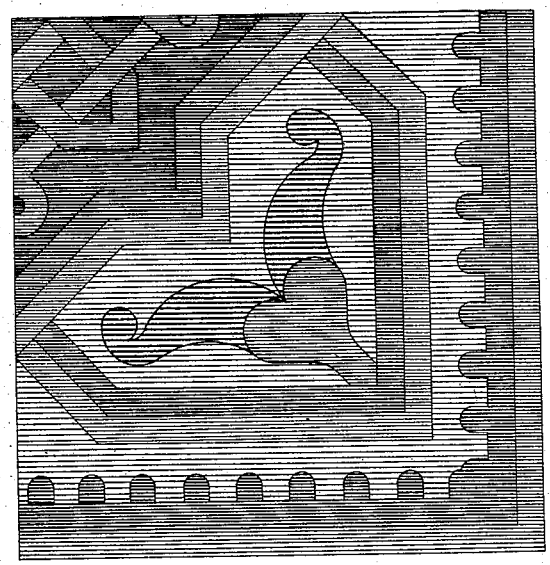
Figure 4:
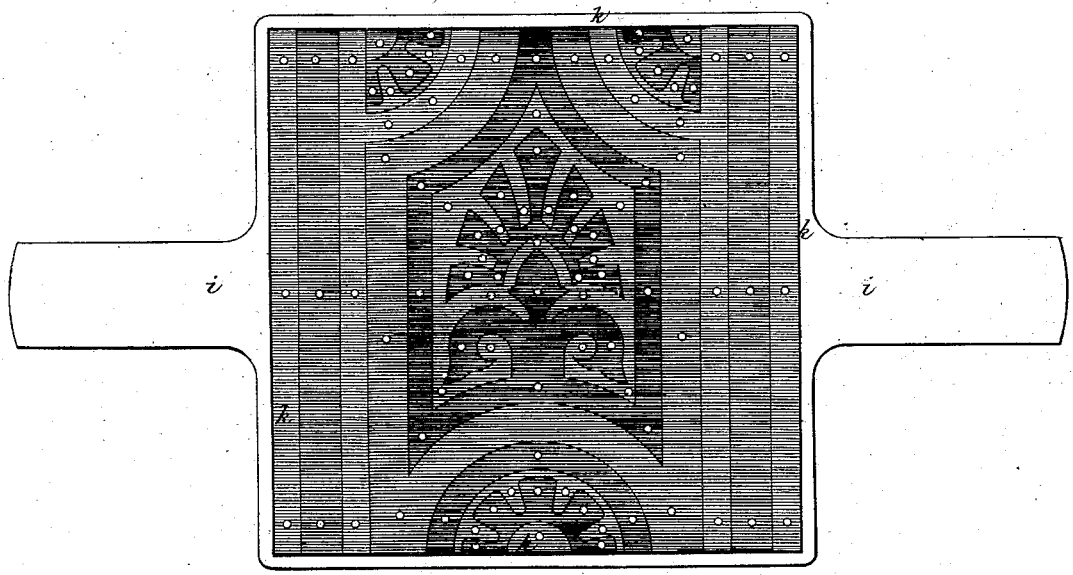
Figure 5:
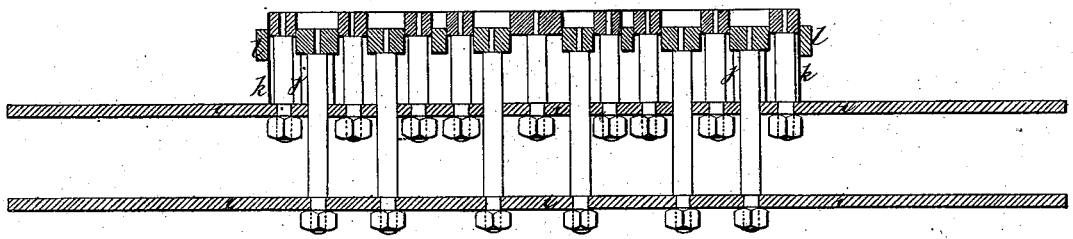
Figure 6:
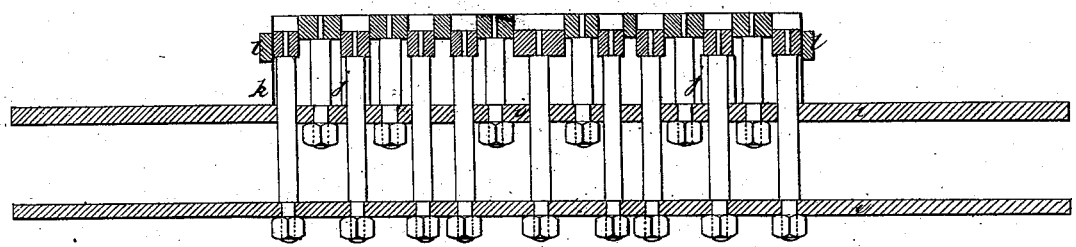

Figures 1, 2, and 3 represent one example, Fig. 1 being a plan, and Fig. 2 a transverse section, of the mold, whereby the whole of the inlaid pattern of the mosaic tile represented in Fig. 3 is produced at one operation. Figs. 4, 5, and 6 represent the other example, which is a modification of the first, Fig. 4 being a plan, and Figs. 5 and 6 vertical sections, of the mold.

Referring to Figs. 1 to 3, wherein the same letters of reference indicate the same parts, this mold is composed of a plate of copper cut out or divided into a number of separate adjustable parts fitting together and corresponding in shape to the various parts of the design. The parts of the mold are separated from one another by thin strips of sheet-copper, $a$, set edgewise to prevent the mixing of the various colors composing the design. These vertical strips are soldered to an iron plate, $b$, and follow the exact outlines of the various portions of the design, and extend close up to the external boundary or frame of the mold, the whole, with the parts hereinafter mentioned, forming a compound or multiple mold producing the whole of the design at one operation. Three other iron plates, $c\ d\ e$, serve each as supports for different parts of the copper plate, which are free to slide up and down, and are independently adjustable relatively to each other, the several parts being fixed to their respective plates $c\ d\ e$ by pillars or rods, and their motion being limited by the tubes or sleeves $f$, through which said pillars pass. The pillars attached to plate $e$, for example, pass freely through the other plates, $h\ c\ d$, and so with the others.

$g\ g$ are legs or supports for the entire mold while being filled.

To produce a pattern of various colors, such as indicated by the various shades in Fig. 3, I proceed as follows: One of the plates—$e$, for example—is first lowered by means of its handle, thereby drawing down those of the parts *h* which are attached to it below the general level of the surface of the mold, as shown in Fig. 2, so as to form cavities of the proper shape to receive the colored material for this portion of the design to be inlaid. These cavities having been carefully filled with colored material, the same operation is repeated for each of the other portions of the design, the several parts of the mold being lowered successively by means of plates *c d* until all are filled with colored material.

It will be understood that the mold may have a greater or less number of the plates by which the different portions of the mold are thus operated, according to the number of colors and complexity of the design.

The advantage of this compound mold is that the whole of the inlaid design that forms the upper portions of the tile can, by inverting the mold, be deposited at one time upon the substratum of material forming the body or base of the tile, which substratum has been previously placed in a pressing-mold, where the whole tile is subjected to great pressure, and thereby rendered homogeneous.

Referring to Figs. 4, 5, and 6, this mold is also composed of metal plates cut or shaped to conform to the parts of the design to be produced, the several parts being supported by pillars on two plates, *i i*, the sliding movement of the different portions of the mold being limited by tubes *j*. In this case there are no separating-strips between the parts of the mold; but there is a vertical strip of sheet-copper, *k*, which surrounds the entire mold, and is inclosed in a metal frame, *l*. The latter rests on the pressing-mold, in order to facilitate the deposit of the material from the cavities of the mold, which in this case is performed in two operations.

It will be understood that on lowering, say, the bottom plate, *i*, the cavities thus left in the surface may be filled with the colored material, which is forthwith deposited on the substratum or base of the tile in the pressing-mold by inverting the mold so that its frame *l* rests on the pressing-mold, and then expelling the colored material from the cavities by pressing on the appropriate plate *i*.

The mold should be so constructed as to leave sufficient space to allow of the second portion of the design, with which it is filled in a similar manner, being readily deposited in the same way in the spaces left for its reception between the portions first deposited.

I am aware that materials for making artificial stone have been treated with a substance to decompose the alkali contained therein to prevent discoloration of said materials, and I do not desire to claim such, broadly, as of my invention.

I claim—

1. In the manufacture of tiles and other ceramics, the process of brightening the colors, consisting in treating the material or cement with a solution of soap previous to baking the tiles, substantially as set forth.

2. In the manufacture of tiles and other ceramic ware, the process of brightening the colors, consisting in moistening the powdered materials or cements with a solution of soft soap to oppose the efflorescence of the salts of lime contained in the powdered material or cement, substantially as set forth.

3. In the manufacture of tiles and other ceramic ware, the process of brightening the colors, consisting in moistening the powdered material or cement with a solution of soft soap, and treating the tiles after they have been molded and while they are yet porous with a solution of soft soap, and then removing the excess of soap, whereby the free alkali potash in the soap displaces a portion of the lime of the opaque insoluble salt in the cement.

4. In a machine for molding tiles and other ceramics, a mold-plate composed of series of separate parts, forming a continuous and practically unbroken surface, each series of said separate parts being vertically adjustable independently of the other, substantially as set forth.

5. In a machine for molding tiles and other ceramics, a mold-plate composed of a series of separate parts adjustable independently of each other by means of independently-operated vertically-sliding rods, substantially as set forth.

6. In a machine for molding tiles and other ceramics, a mold-plate composed of a series of separate parts adjustable independently of each other by means of independently-operated vertically-sliding rods mounted in plates beneath the mold, said rods being provided with tubes or sleeves between the plates to limit their vertical movement, substantially as set forth.

7. In a machine for molding tiles and other ceramics, a mold-plate composed of a series of separate and independently-operated parts and a series of metallic forms corresponding in shape to the parts of the mold, mounted on a plate beneath the said parts of the mold, and extending up flush with the upper surface of said mold parts, substantially as set forth.

The foregoing specification of my improvements in the manufacture of mosaic and other tiles signed by me this 10th day of November, 1883.

JEAN LARMANJAT.

Witnesses:
ROBT. M. HOOPER,
JEAN BAPTISTE ROLLAND.